E. HAGENBUCHER.
REGULATING DEVICE FOR HYDRAULIC POWER PLANTS.
APPLICATION FILED DEC. 14, 1914.
1,193,381.   Patented Aug. 1, 1916.
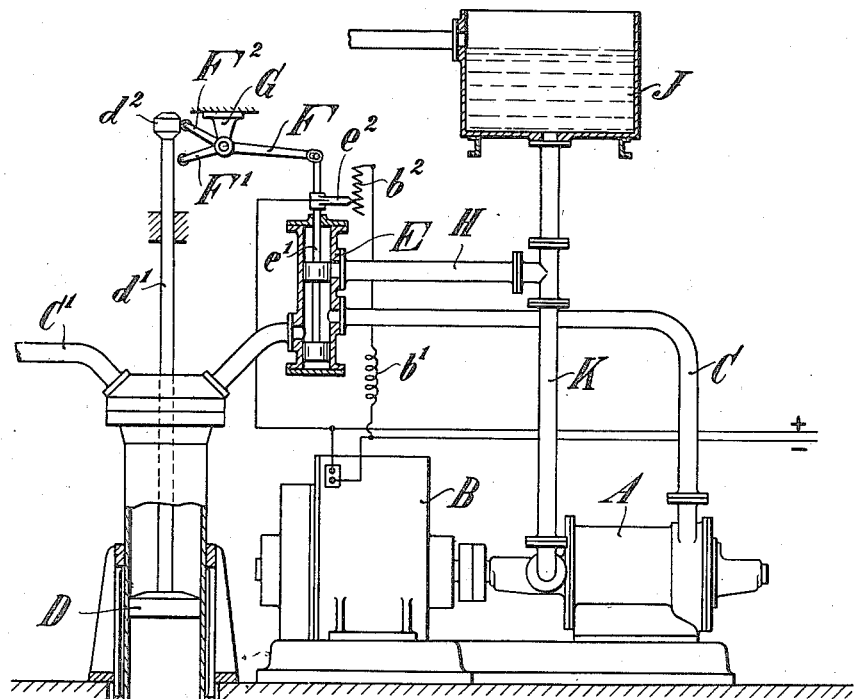
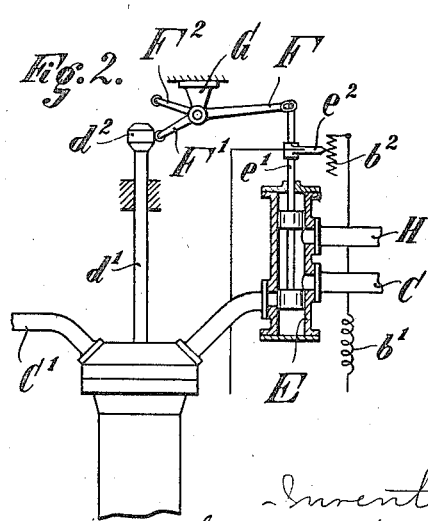

UNITED STATES PATENT OFFICE.

EUGEN HAGENBUCHER, OF ESSEN-ON-THE-RUHR, GERMANY, ASSIGNOR TO FRIED. KRUPP AKTIENGESELLSCHAFT, OF ESSEN-ON-THE-RUHR, GERMANY.

REGULATING DEVICE FOR HYDRAULIC-POWER PLANTS.

1,193,381.     Specification of Letters Patent.     Patented Aug. 1, 1916.

Application filed December 14, 1914. Serial No. 877,207.

*To all whom it may concern:*

Be it known that I, EUGEN HAGENBUCHER, residing at Essen-on-the-Rhur, Germany, a citizen of the German Empire, have invented a certain new and useful Improvement in Regulating Devices for Hydraulic-Power Plants, of which the following is a specification.

The present invention relates to regulating devices for hydraulic power plants having a centrifugal pump and an accumulator, which, when completely filled, holds the device in such a position that the pump feeds into a conduit for idle running, instead of into the main conduit. In known plants of this kind, it has been found that an inadmissible heating of the water occurs when the machine runs free. It has already been tried to overcome this disadvantage in a different manner, as for instance by inserting a cooler in the conduit for idle running.

The present invention has for its object to remove this disadvantage in a simple manner.

In the accompanying drawing one embodiment of the invention is illustrated, and Figure 1 shows a diagrammatic representation, partly in section, of the plant in side elevation, and Fig. 2 a portion of Fig. 1, with the regulating device in a different position.

The centrifugal pump A is coupled to a shunt-connected motor B, the field winding $b^1$ of which has series connection with a regulating resistance $b^2$. In the pressure conduit C is inserted a piston valve E, between the pump A and the compressed air accumulator, which is provided with a piston head D. The spindle $e^1$ of this valve E may be so adjusted, by means of the arm F of a three-armed lever, mounted in a suspension bearing G, that the pump A either connects with the accumulator and the line conduit $C^1$ leading from the accumulator to the place of consumption, see Fig. 1; or else connects with a conduit H for idle running, see Fig. 2, which is in connection with the piston valve E on the pressure conduit C, the conduit H opening into another conduit K, running from a collecting tank J to the pump A. The piston rod $d^1$, rigidly attached to the piston head D of the accumulator, is at its free end provided with a collar $d^2$, with which it impinges against the second arm $F^1$ of the three-armed lever, see Fig. 2, when the piston head D is situated in its lowermost position and the accumulator is completely filled. The third arm $F^2$ of the three-armed lever then projects into the path of the collar $d^2$ in such a manner that it will be shifted by an upward movement of the piston head D directly the latter has left its lowermost position, and the three-armed lever F, $F^1$, $F^2$, as a consequence arrives into the position indicated in Fig. 1.

In the position of the three-armed lever F, $F^1$, $F^2$ illustrated in Fig. 2, the spindle $e^1$ of the valve E, pivoted to the arm F, is so adjusted, that the pump A is cut off from the accumulator, and instead connected with the conduit H for idle running, while it is sufficiently displaced, when in the position shown in Fig. 1, to permit the pump to connect with the accumulator and the line conduit $C^1$, and disconnect from the conduit H for idle running. To the valve spindle $E^1$ is rigidly attached a contact finger $e^2$, connecting with the shunt coil of the motor B, which finger may slide on the regulating resistance coil $b^2$ of the motor, when the spindle $e^1$ is displaced, thereby inserting a smaller or greater amount of resistance in the shunt circuit, causing an adjustment of the number of revolutions of the motor in the usual manner.

In the position illustrated in Fig. 1, where the valve connects the pump A with the accumulator and the line conduit $C^1$, the motor B is regulated for normal running, and in the position illustrated in Fig. 2, where the valve connects the pump with the conduit H for idle running, the motor is regulated to much slower running. By suitable selection of the number of revolutions in the latter case, it can easily be attained that no inadmissible heating occurs, when the pump feeds into the conduit for idle running.

I claim:

1. In a regulating device for hydraulic power plants having a centrifugal pump and an accumulator; a feed conduit between the pump and the accumulator, and a line conduit from the latter; regulating means in the feed conduit having a waste conduit, a member in said accumulator for controlling said regulating means, said means comprising a member for regulating the speed of the pump, whereby the number of revolutions of said pump will be less, when the pump has been adjusted by said means to feed into the waste conduit, than when adjusted to feed into the line conduit.

2. In a regulating device for hydraulic power plants having a centrifugal pump and an accumulator; a feed conduit between the pump and the accumulator, and a line conduit from the latter; regulating means in the feed conduit having a waste conduit, said means comprising a member for regulating the speed of the pump, whereby the number of revolutions of said pump will be less, when the pump has been adjusted by said means to feed into the waste conduit than when adjusted to feed into the line conduit; and a float in said accumulator for actuating said regulating means.

3. In a regulating device for hydraulic power plants having a centrifugal pump and an accumulator; a feed conduit between the pump and the accumulator, and a line conduit from the latter; a piston valve in said feed conduit having a waste outlet, an actuating lever journaled to the valve piston, said lever having two spread-out fingers, a piston head and rod in said accumulator, said fingers projecting into the path of said piston rod, whereby the end of the piston rod is made to contact with one of said fingers, thereby closing the feed conduit to the accumulator and opening the waste outlet, when the accumulator is completely filled; and the end of the piston is made to contact with the other of said fingers during normal running and when the accumulator is not full, thereby opening the feed conduit to the accumulator, and to the line conduit, and closing the waste outlet.

4. In a regulating device for hydraulic power plants having a centrifugal pump and an accumulator; a feed conduit between the pump and the accumulator, and a line conduit from the latter; a piston valve in said feed conduit having a waste outlet, an actuating lever journaled to the valve piston, said lever having two spread-out fingers, a piston head and rod in said accumulator, said fingers projecting into the path of said piston rod, whereby the end of the piston rod is made to contact with one of said fingers, thereby closing the feed conduit to the accumulator and opening the waste outlet, when the accumulator is completely filled; and the end of the piston is made to contact with the other of said fingers during normal running and when the accumulator is not full, thereby opening the feed conduit to the accumulator, and to the line conduit, and closing the waste outlet, said valve piston simultaneously and respectively decreasing and increasing the speed of said pump.

The foregoing specification signed at Barmen, Germany, this 29th day of October, 1914.

EUGEN HAGENBUCHER. [L. S.]

In presence of—
ALBERT NUFER,
GEORGE GHLOARD.